Figure 3:
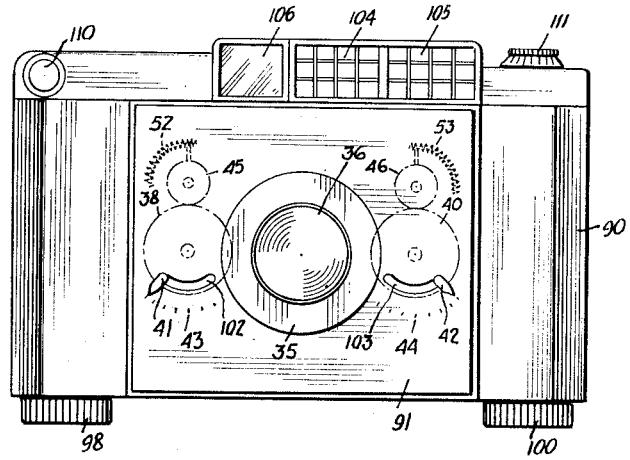

July 25, 1944.   K. RATH   2,354,544
AUTOMATIC EXPOSURE CONTROL
Filed June 10, 1943   2 Sheets-Sheet 1
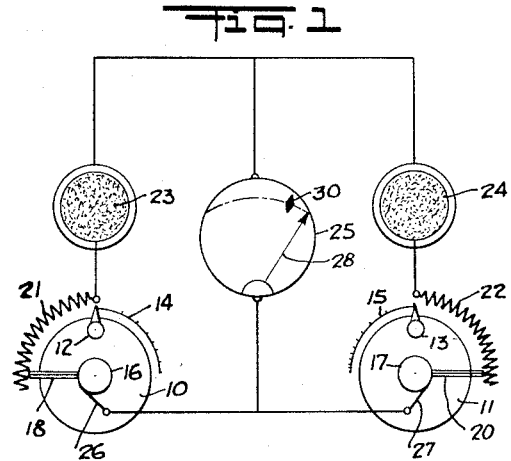
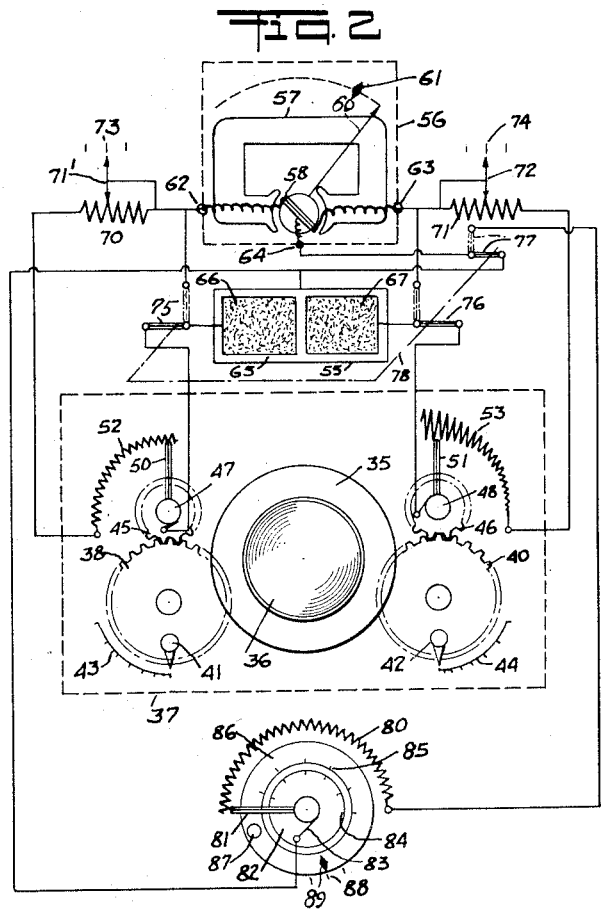
INVENTOR.

July 25, 1944. K. RATH 2,354,544
AUTOMATIC EXPOSURE CONTROL
Filed June 10, 1943 2 Sheets-Sheet 2

INVENTOR.

Patented July 25, 1944

2,354,544

UNITED STATES PATENT OFFICE 2,354,544

AUTOMATIC EXPOSURE CONTROL

Karl Rath, New York, N. Y.

Application June 10, 1943, Serial No. 490,255

10 Claims. (Cl. 95—10)

My invention relates to exposure control apparatus for photographic cameras of the general type comprising a photoelectric cell suitably built in a camera and means for reducing the photoelectric response current, proportional to the brightness of a photographic scene or object, to a predetermined value determined by an index mark of the like, said reducing means being coupled with the exposure control adjusting means of the camera, whereby to set said adjusting means to the proper position for obtaining a correctly exposed photograph under varying scene or object brightness conditions.

In the standard photographic camera, exposure is determined principally by the product of the lens aperture adjustable to variable openings by the aid of an iris diaphragm or the like and, the exposure time or period of the shutter opening during which the light passing through the lens acts on the sensitive emulsion of the plate or film in the focal plane of the camera. Other secondary factors controlling the exposure such as emulsion sensitivity or film speed, filter factors, etc., may remain constant during a longer period as long as the same film or filter are used by the photographer.

The choice of the lens aperture also known as stop value and of the exposure time is in most cases by no means arbitrary, but is determined by pictorial and other considerations which make it highly desirable to choose and pre-set either to suit existing conditions and picture taking requirements and to control the adjustment of the other in dependence upon the response of the photoelectric cell in accordance with an existing scene or object brightness. Thus, it may be desirable or necessary to insure a certain depth of focus determined in a known manner by the stop or lens aperture. In this case, the control apparatus should enable the adjustment of the coordinated exposure time for a given scene brightness. Vice versa, there are cases when a certain exposure time or shutter speed is required to prevent blurring of the picture due to camera movement or fast moving objects or for any other reason. In this case, the control apparatus should enable the adjustment of the aperture to the correct value under various scene or object brightness conditions.

Accordingly, it is an object of my invention to provide an exposure control apparatus of the above character structurally embodied in a photographic camera and capable of mutual operation with regard to lens aperture and exposure time, in such a manner as to allow either adjustment to be chosen in advance at the discretion of the photographer, while enabling the other adjustment to be controlled or set to the proper value in dependence upon the response of a photoelectric cell in accordance with an existing scene or object brightness.

Arrangements of the aforementioned type have already become known in the art, but all possess serious disadvantages due primarily to the fact that the pre-setting of one exposure control adjustment interferes with or reacts upon the other adjustment so as to make it impossible to insure a correct and accurate exposure control without the use of complicated mechanical compensating arrangements and other precautions prohibiting the use of automatic exposure control in portable cameras for amateur and other nonprofessional users.

Accordingly, it is a further object of my invention to provide an exposure control apparatus of the above character which is both simple in design and easy in operation and which allows the lens aperture and exposure time adjustments to be effected substantially independently and without mutual interference liable to affect the accuracy of the exposure control.

A more specific object of my invention is to provide an exposure control apparatus of the type referred to embodying substantially independent photoelectric circuits associated with each of the exposure control adjustments for the lens aperture and exposure time, respectively, in a camera and purely mechanical means for correlating the response of said circuits in such a manner as to enable the setting of either adjustment to the correct value upon previous settings of the other adjustment to a desired chosen value, to insure a correctly exposed photograph under various scene or object brightness conditions.

Figure 4:
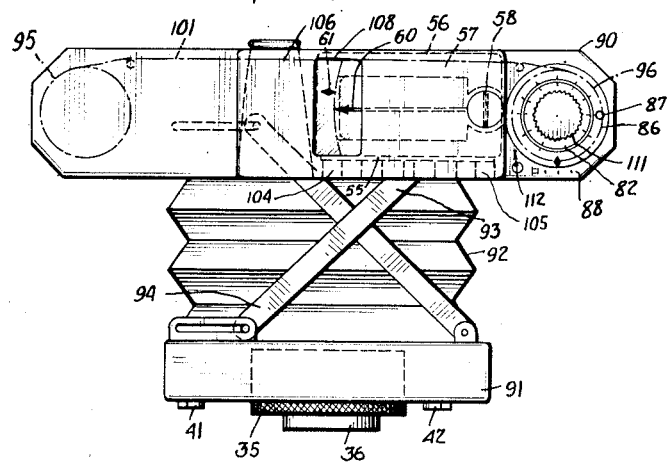

The above and further objects as well as aspects of the invention will become more apparent from the following detailed description taken with reference to the accompanying drawings forming part of this specification and wherein:

Figure 1 is a diagrammatic representation illustrating an exposure control system embodying the principles of the invention; Figure 2 shows a modification of an exposure control system according to Figure 1; and Figures 3 and 4 are front and top views, respectively, of a photographic camera structurally embodying exposure control apparatus of the type shown in Figure 2.

Like reference numerals identify like parts in the different views of the drawings.

Referring more particularly to Figure 1, I have shown at 10 and 11 the exposure time and lens aperture or stop adjustments, respectively, for a camera which may have the form of rotatable rings, discs or the like forming part of the shutter mechanism of any design known in the art. The adjustments 10 and 11 may be operated in any suitable manner such as by the aid of adjusting knobs 12 and 13, each being provided with an index or pointer arranged to cooperate with an exposure time and stop scale 14 and 15, respectively, in a manner well understood.

The adjustments 10 and 11 are furthermore provided with shafts 16 and 17 each having mounted thereon a sliding contact or brush 18 and 20 arranged to cooperate with a pair of variable resistance elements 21 and 22, whereby to insert variable amounts of electric resistance in the respective circuits of a pair of photoelectric cells 23 and 24.

The photoelectric cells 23 and 24 which advantageously are of the self-generating barrier layer type and preferably of the same size and electrical characteristics, have one pole or terminal thereof connected to the fixed ends of the resistances 22 and 23, the other terminals of each of said cells being connected to one of the terminals of an electrical current indicator or microammeter 25. The other terminal of said indicator is connected to the sliding contacts or brushes 18 and 20 by way of slip rings 26 and 27 or the like sliding upon the shafts 16 and 17, respectively, in a manner well understood from the drawings. In this manner, the electric circuits of the light-sensitive cells 23 and 24 are substantially independent of each other and separately shunted across the indicator 25. The latter is provided with a needle or pointer 28 moving over the dial having applied thereto an index or fiduciary mark 30 defining a predetermined current value or pointer deflection.

In use, either of the adjustments 10 or 11 may be chosen at will, whereby to cause the pointer 28 of the indicator 25 to be deflected to a certain position above or below the indicating mark 30, provided the photoelectric cells are properly aimed toward the scene or object to be taken in a manner well understood by those skilled in the art. Thereupon, the other adjustment is operated to a point so as to cause the pointer deflection to coincide with the mark 30 which will automatically result in the proper exposure adjustment for the existing scene or object brightness. Thus, supposing that it is desired to work with a shutter speed of say 1/25 second, all that is required is to set the adjustment 10 to a position where the index of the adjusting knob 12 is opposite to the speed number 1/25 on the scale 14, resulting in a certain deflection of the pointer 28 from its initial or zero position shown in the drawing, provided the camera is properly held and aimed in the direction of the scene to be photographed so that only light that emanates from the scene or object will affect the sensitive surface of the photoelectric cells 23 and 24. While retaining the camera in this position, adjustment 11 is then operated by the aid of knob 13 until the end of pointer 28 coincides with the mark 30, in which case the stop or aperture has been set to the proper value necessary to insure a correctly exposed picture for the existing scene or object brightness. Vice versa, supposing it is desired to work with a stop of say F6.3 to obtain a desired depth of focus or for any other reason, all that is necessary is to set the adjustment 11 to a position where the index of the adjusting knob 13 is opposite the number 6.3 on the stopscale 15, whereupon adjustment 10 is operated to a point until the end of pointer 28 coincides with the mark 30, resulting in the proper exposure time adjustment for the existing scene or object brightness.

Among the advantages of an exposure control system afore-described is the fact that the electrical circuits associated with the exposure time and stop adjustments 10 and 11 are substantially independent and that the electrical variations in the circuits are correlated in a purely mechanical manner by producing a combined torque on the meter movement or pointer 28, avoiding in this manner any mutual reaction and enabling the electrical variation in one circuit to be effected substantially independently of the variation in the other circuit. This in turn makes it possible to dispense with complicated compensating arrangements to correlate variations following different physical laws such as the exposure time and lens aperture adjustments. Thus, in the case of the invention it is a simple matter to design the resistance 22 to vary according to an exponential law to correlate equal electrical changes in the respective circuit with equal amounts of exposure in view of the well known fact that the variation of a lens aperture by the aid of an iris diaphragm for equal adjusting values follows an exponential rather than linear law as in the case of exposure time. This correlation or compensation may be easily realized by varying the cross section of or the spacing between successive winding turns of the associated resistance element, if the latter is of the well known wire wound type. Other advantages obtained from the separation of the electrical circuits will be obvious to those skilled and result in a substantial simplification of the design as well as increased ease of operation of an exposure control of this type.

The arrangement and design of the circuit constants may be such that in the case of one extreme condition with the illumination of the photoelectric cells 23 and 24 being a maximum corresponding to the maximum scene brightness for which the system is designed to operate and with the compensating resistances 21 and 22 fully inserted in the circuits as shown in the drawing corresponding to the adjustment 10 being set to the fastest shutter speed, say 1/250 sec., and the adjustment 11 being set to the smallest stop, say F.11, the pointer 28 will coincide with the mark 30, indicating that with these extreme settings of exposure time and stop, the upper limit of the automatic control range has been reached. For higher scene brightness values, the pointer deflection will increase that is the pointer will move in the direction towards the left from the mark 30 with the adjustments 10 and 11 remaining in the extreme position as mentioned, indicating thereby to the photographer that the light conditions are beyond the upper limit of the operating range for the automatic control. In this case the automatic control may be suspended and the meter used for manual operation in the manner to be described presently in connection with Figure 2. If, on the other hand, the scene brightness becomes less than the above mentioned maximum, the pointer deflection will decrease that is the pointer will move towards the right of the mark 30, thus making it necessary to move either or both adjustments 10 and 11 from their extreme positions as indicated to reduce the resistance in the photoelectric circuits and in turn increase the exposure time and/or stop until the pointer 28 again coincides with the mark 30, in which case the system is set for correct exposure.

In the other extreme condition of the operating range corresponding to the lowest illumination of the photoelectric cells 23 and 24 or scene brightness for which the system is designed to function and in which case resistances 21 and 22 are substantially excluded from the circuits corresponding to longest exposure time, say 1/25 sec., and the greatest stop say F.2 within the automatic operating range, pointer 28 will again just coincide with the mark 30, indicating thereby to the photographer that the lower limit of the operating range has been reached. If in this case the scene brightness increases, the pointer 28 will move in the direction of greater deflections or in a direction towards the left of mark 30, thereby making it necessary to insert more resistances into the circuits by moving the controls 12 and/or 13 to positions corresponding to a smaller exposure time and/or stop value, until the pointer again coincides with the mark 30 in which case the system is adjusted for correct exposure. If, on the other hand, the scene brightness decreases still further i. e. if the pointer with both resistances entirely excluded from the circuits assumes a position below or to the right of mark 30, this will indicate that the lower operating limit has been passed and that an automatic control in the manner described is no longer possible.

Referring to Figure 2, I have shown schematically a complete exposure control system constructed in accordance with the invention and suitable for embodiment in a camera having a so-called central shutter 35 surrounding the lens 36 and mounted in the front casing or panel 37 of the camera which may be either of the box or collapsible bellows type. I have furthermore shown a pair of gears 38 and 40 suitably coupled with the exposure time and stop adjustments of the shutter 35 and adjustable by the aid of operating knobs or the like 41 and 42 advantageously arranged in front of the panel 37 and provided with pointers moving along the exposure time and stop scales 43 and 44, respectively. In this manner, stop and exposure time may be adjusted in the ordinary way independently of the automatic control.

Gears 38 and 40 in turn are in meshing relation with gears 45 and 46, the latter having shafts 47 and 48 carrying brushes or sliding contacts 50 and 51 which in turn are arranged to cooperate with the resistance elements 52 and 53, respectively, of the wire wound or any other suitable type in substantially the same manner as described hereinabove in reference to Figure 1. Resistance 53 has been shown to have the cross-section of its winding turns vary exponentially to obtain equal variation of resistance for equal variations of stop in terms of exposure.

The photoelectric cell 55 is of a special design suitable for the invention. The indicator 56 is shown to comprise a magnet structure 57 having an air gap with a moving coil 58 rotatably mounted therein in a known manner and carrying a pointer 60 moving over a dial upon which is provided an index or fiduciary mark 61 in substantially the same manner as shown in Figure 1. One end of the coil 58 is connected through a flexible lead to the terminal 62 and the other end of coil 58 is connected through the flexible lead to the terminal 63. The center of coil 58 is furthermore connected through a flexible lead to a further terminal 64 which may correspond to or be constituted by the metal body of the camera.

The photoelectric cell 55 comprises a common base plate 65 of iron, copper or the like, having applied thereto a pair of isolated layers 66 and 67 of light sensitive material such as crystalline selenium or cuprous oxide, which are in turn coated in a known manner with translucent metallic layers. The latter form one of the electrodes of the cell, the cooperating common electrode being constituted by the base plate 65. The top or covering electrodes 66 and 67 are connected by way of suitable connecting leads each to one of the brushes or sliding contacts 50 and 51 of the resistances 52 and 53, respectively, through slip rings or in any other suitable manner well understood from the above.

By connecting the base plate 65 with the terminal 64 or center of the magnet coil 58 and by connecting the terminals 62 and 63 with the fixed ends of the resistances 52 and 53, respectively, as shown, the two electrical circuits including the photoelectric cells and compensating resistances 52 and 53 are completed. Since each circuit contains a different portion of the moving coil 58, the separation of the circuits is a complete one and their combined effect on the indicator is of a purely mechanical nature by producing a common torque on the moving coil operating the pointer 60. The function and operation of the system is otherwise substantially similar to that according to Figure 1. Instead of using a center-tapped moving coil for the indicator, the coil may be wound in two separate sections oriented in the same direction so as to produce a resultant torque or pointer deflection in accordance with the combined currents flowing in the photoelectric circuits each containing one of said winding sections, as is well understood from the above.

In order to consider other factors controlling the exposure, such as film speed etc., I have shown a pair of further resistances 70 and 71 connected in series with the electric circuit each having an adjusting member 71' and 72 arranged to cooperate with an indicating scale 73 and 74, respectively. Scale 73, for instance, may be calibrated in film speed values and scale 74 may represent filter factors. In this manner variable amounts of resistance are inserted in the photoelectric circuits, whereby to modify the adjustments of the resistances 52 and 53 in a manner to include the additional factors in the final exposure control. The film speed or other secondary exposure controlling factors may be considered in any other suitable manner such as by adjustable resistances connected and shunt to the moving coil winding 58 or a section thereof or by reducing the light impinged upon the photoelectric cells by the aid of suitable adjustable dimming devices such as iris diaphragms, movable shutters, photometric wedges, etc., or in any other suitable manner known in the art.

The arrangement for automatic exposure control is advantageously designed to operate within a certain scene brightness range determined by the characteristics of the system as described hereinabove. Outside this range, as indicated if the pointer deflection remains below or above the mark 61 in the extreme adjusting positions of the numbers 10 and 11, the automatic operation may be suspended by throwing a multiple switch having arms 75, 76 and 77 connected by a common operating member 78 from the position shown in full lines to the dotted line position, whereby to disconnect the compensating resistances 52 and 53 from the photoelectric cells and connecting a different variable resistance 80 forming an integral part of a mechanical calculator or computing device and having a sliding contact 81 mounted upon a rotatable member 82 and slip ring connection 83, in shunt to each of the photoelectric cells and one section of the moving coil 58 in series. Member 82 carries a first scale 84 and is arranged to cooperate with a further adjustable scale member 86 carrying a second scale 85. Scales 84 and 85 may be calibrated in stop and exposure time values, respectively. Scale member 86 is adjustable relative to scale member 82 by the aid of an adjusting knob 87 and in accordance with an additional fixed scale 88 representing film speeds and cooperating with a suitable index 89 upon the member 86. In this manner, after scale 86 has been adjusted in accordance with a film speed used, adjustment of scale member 82 to a position where the pointer 60 of the indicator 56 coincides with the mark 61 or a separate index mark provided for this operation, will result in the proper alignment of the exposure time and stop scales 84 and 85, whereby any pair of coordinated values on said scales may be chosen for manually setting the shutter of the camera to obtain a correct exposure under the given scene brightness condition.

Referring to Figures 3 and 4, I have shown a practical embodiment of an exposure control apparatus according to Figure 2 in structural combination with a camera of the collapsible bellows type. The camera shown is of standard construction and comprises a body 90, a front panel or shutter casing 91 connected with said body through a collapsible bellows 92 by means of a pair of lazy tongs 93 and 94 or any other suitable linkage arrangement of well known design. Numerals 95 and 96 indicate the supply and take-up film spools and numerals 98 and 100 are the winding and rewinding knobs for moving the film 101 past the picture frame in the focal plane of the camera in a manner well known to those skilled in the art.

The couplings between the stop and exposure time adjustments of the shutter with the variable compensating resistances 52 and 53 are substantially the same as shown in Figure 3 and are suitably mounted within the casing or panel 91, with the controls 41 and 42 projecting through arcuate slots 102 and 103 in the front wall of panel 91 and terminating in pointers bent at a right angle and cooperating with the exposure time and stop scales 43 and 44, respectively, applied to the front of the casing 91. The indicator 56 and photoelectric cell 55 are suitably mounted upon the top of the camera body 90, the composite cell 55 being arranged in front of the indicator and provided with suitable light baffles 104 and 105 of the cellular or any other known type placed in front of the cells to restrict the effective acceptance angle of the cells to a value equal to the field or picture angle of the camera also covered by the view finder 106.

The indicator and photoelectric cells are surrounded by a protective housing with only the dial and index 61 and the pointer 60 of the indicator being visible through a viewing window 108. This housing may contain further auxiliary apparatus such as the view finder 106 suitably combined with a range finder or distance meter of the coincidence type and comprising a further light admitting window 110 well known in the art. Other well known details have been omitted as being immaterial for the understanding of the invention and for simplicity of illustration.

The mechanical calculator and adjustable resistance 80 for manual non-automatic operation of the exposure meter may be suitably mounted in the space adjacent to the meter housing on the top of the camera body as clearly shown in Figure 4. In the latter, numeral 111 indicates a knurled adjusting knob for operating the resistance (see 80 according to Figure 2) and scale member 82 and 112 illustrates a multiple switch corresponding to the switch 75, 76, 77, 78 of Figure 3 to change from automatic to manual operation and vice versa indicated by the switch positions marked I and II in the drawings.

The electrical connections between the compensating resistance and the photoelectric cells and the indicator may be made by means of suitable flexible wire leads arranged within the bellows 92 or suitably secured to the connecting links 93 and 94 so as to be hidden from sight in the normal position of the camera.

The variation of the photoelectric currents to effect coincidence of the pointer with the index mark of the indicator may also be carried out by means of variable light dimming devices such as iris diaphragms, photometric wedges etc. mounted in front of the photoelectric cells and having adjusting members coupled with the lens aperture and exposure time adjustments of the camera.

It will be evident from the foregoing that the invention is not limited to the specific details, arrangement of parts and constructions shown and disclosed herein for illustration, but that the underlying thought and principle of the invention are susceptible of numerous variations and modifications coming within the broader scope and spirit thereof as defined by the appended claims. The specification and drawings are accordingly to be regarded in an illustrative rather than a limiting sense.

I claim:

1. In exposure control apparatus for a photographic camera having lens aperture and exposure time adjusting means, a current indicator having means to indicate a predetermined current, a pair of photoelectric cells in shunt relation and connected to said indicator to produce a combined additive response of said indicator by the currents supplied by said cells, said cells being arranged to be simultaneously illuminated by light emanating from a scene to be photographed, a variable electrical resistance in positive coupling connection with one of said adjusting means and connected in the shunt circuit of one of said photoelectric cells, and a further variable electrical resistance in positive coupling connection with the other of said adjusting means and connected in the shunt circuit of the other of said photoelectric cells.

2. In exposure control apparatus for a photographic camera having lens aperture and exposure time adjusting means, a current indicator having means for indicating a predetermined current, a pair of self-generating photoelectric cells in shunt relation and connected to said indicator to produce a combined additive response of said indicator by the currents generated by said cells, said cells being arranged to be simultaneously illuminated by light emanating from a scene to be photographed, a variable electrical resistance in positive coupling connection with one of said adjusting means and connected in the shunt circuit of one of said photoelectric cells, and a further variable electrical resistance in positive coupling connection with the other of said adjusting means and connected in the shunt circuit of the other of said photoelectric cells.

3. In exposure control apparatus for a photographic camera having lens aperture and exposure time adjusting means, a current indicator comprising a moving coil rotatable in a magnetic field and a pointer arranged to cooperate with a fixed index mark, a pair of self-generating photoelectric cells in shunt relation and connected to said moving coil to produce a combined additive torque on said coil in response to both currents generated by said cells, said cells being arranged for simultaneous illumination by light emanating from a scene to be photographed, a variable electrical resistance in positive coupling connection with one of said adjusting means and connected in the shunt circuit of one of said photoelectric cells, and a further variable electrical resistance in positive coupling connection with the other of said adjusting means and connected in the shunt circuit of the other of said photoelectric cells.

4. In exposure control apparatus for a photographic camera having lens aperture and exposure time adjusting means, a current indicator comprising a moving coil rotatable in a magnetic field and a pointer arranged to cooperate with a fixed index mark, a pair of self-generating photoelectric cells each connected to a different half section of said coil whereby to produce a combined additive torque on said coil in response to both currents generated by said cells, said cells being arranged for simultaneous illumination by light emanating from a scene to be photographed, a variable electrical resistance in positive coupling connection with one of said adjusting means and connected in series with one of said photoelectric cells, and a further variable electrical resistance in positive coupling connection with the other of said adjusting means and connected in series with the other of said photoelectric cells.

5. In exposure control apparatus for a photographic camera having lens aperture and exposure time adjusting means, a current indicator comprising a moving coil rotatable in a magnetic field and a pointer arranged to cooperate with a fixed index mark, a pair of self-generating photoelectric cells each connected to a different half section of said cell whereby to produce a combined additive torque on said coil in response to both currents generated by said cells, said cells being arranged for simultaneous illumination by light emanating from a photographic scene, a variable electrical resistance in positive coupling connection with one of said adjusting means and connected in series with one of said photoelectric cells, and a further variable electrical resistance in positive coupling connection with the other of said adjusting means and connected in series with the other of said photoelectric cells.

6. In exposure control apparatus for a photographic camera having lens aperture and exposure time adjusting means, a current indicator with means to indicate a predetermined current therethrough, a pair of self-generating photoelectric cells both connected to said indicator to produce a combined response thereof by both currents generated by said cells, a pair of variable resistance elements each in positive coupling connection with one of said adjusting means and connected in series with one of said photoelectric cells, a computing device comprising relatively adjustable scale members having graduations representing stop and exposure time, respectively, a further variable resistance having an operating member coupled with one of said scale members, and switch means for disconnecting said first mentioned resistance elements from said photo-electric cells and indicator and simultaneously connecting said further resistance in series with said indicator and vice versa.

7. In exposure control apparatus for a photographic camera having lens aperture and exposure time adjusting means, a current indicator comprising a moving coil rotatable in a magnetic field and a pointer arranged to cooperate with a fixed index mark, a pair of self-generating photoelectric cells each connected across one end of said coil and a common center point thereof whereby to produce a combined torque on said coil in response to both currents generated by said cells, a pair of variable electrical resistance elements each in positive coupling connection with one of said adjusting means and connected in series with one of said photoelectric cells, a computing device comprising relatively adjustable scale members having graduations representing exposure time and lens aperture, respectively, a further variable resistance having an operating member coupled with one of said scale members, and switch means for disconnecting said first mentioned resistance elements from said photoelectric cells and said indicator and for simultaneously connecting said further resistance in series with the common return between said center point and said photoelectric cells and vice versa.

8. In a system of exposure control for a photographic camera having lens aperture and exposure time adjusting means, a current indicator having means to indicate a predetermined current, a pair of self-generating photoelectric cells of like electrical characteristics in shunt relation and connected to said indicator to produce a combined additive response of said indicator by the currents generated by said cells, said cells being arranged for simultaneous illumination by light rays emanating from a photographic scene, a first variable electrical resistance in positive coupling connection with one of said adjusting means and connected in the shunt circuit of one of said photoelectric cells, and a further variable electrical resistance in positive coupling connection with the other of said adjusting means and connected in the shunt circuit of the other of said photoelectric cells, said predetermined current corresponding to a minimum aperture and minimum exposure time at maximum illumination of said cells and corresponding to a maximum aperture and maximum exposure time at minimum illumination of said cells within the automatic operating range of said system.

9. In a system of exposure control for a photographic camera having lens aperture and time adjusting means, a current indicator with means to indicate a predetermined current therethrough, a pair of self-generating photoelectric cells of like electrical characteristics connected to said indicator to produce a combined response thereof by both currents generated by said cells, a pair of electrical resistance elements each inserted in series with one of said photoelectric cells and having operating members each coupled with one of said adjusting means, said predetermined current corresponding to a minimum aperture and a minimum exposure time at maximum illumination of said cells and corresponding to a maximum aperture and a maximum exposure time at minimum illumination of said cells within the automatic operating range of said system, and means including switch means for disc-connecting said resistance elements from said photoelectric cells and indicator and for utilizing the response of said indicator for manually computing the exposure time and lens aperture for lighting conditions outside the automatic range of said system.

10. In exposure control apparatus for a photographic camera having lens aperture and exposure time adjusting means, a current indicator with means to indicate a predetermined current therethrough, a pair of photoelectric cells in shunt relation and connected to said indicator to produce a combined additive response of said indicator by the currents supplied by said cells, said cells being arranged for simultaneous illumination by light emanating from a photographic scene, control means for individually varying the response current of said photoelectric cells, one of said control means being arranged in positive coupling connection with one of said adjusting means and the other of said control means being arranged in positive coupling connection with the other of said adjusting means.

KARL RATH.